(12) United States Patent
Chen et al.

(10) Patent No.: US 7,886,084 B2
(45) Date of Patent: *Feb. 8, 2011

(54) OPTIMIZED COLLECTIVES USING A DMA ON A PARALLEL COMPUTER

(75) Inventors: Dong Chen, Croton On Hudson, NY (US); Dozsa Gabor, Ardsley, NY (US); Mark E. Giampapa, Irvington, NY (US); Phillip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 11/768,645

(22) Filed: Jun. 26, 2007

(65) Prior Publication Data

US 2009/0006662 A1    Jan. 1, 2009

(51) Int. Cl.
G06F 13/28    (2006.01)
G06F 13/00    (2006.01)
(52) U.S. Cl. .......................... 710/22; 710/34
(58) Field of Classification Search ........................ None
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A * | 8/1992 | Zook et al. | 360/54 |
| 5,349,587 A | 9/1994 | Nadeau-Dostie et al. | |
| 5,353,412 A | 10/1994 | Douglas et al. | |
| 5,452,432 A * | 9/1995 | Macachor | 710/22 |
| 5,524,220 A | 6/1996 | Verma et al. | |
| 5,634,007 A | 5/1997 | Calta et al. | |
| 5,659,710 A | 8/1997 | Sherman et al. | |
| 5,708,779 A | 1/1998 | Graziano et al. | |
| 5,748,613 A | 5/1998 | Kilk et al. | |
| 5,761,464 A * | 6/1998 | Hopkins | 710/310 |
| 5,796,735 A | 8/1998 | Miller et al. | |

(Continued)

OTHER PUBLICATIONS

Adiga et al., Blue Gene/L Torus Interconnection Network, IBM Journal of Research and Development, 2005, pp. 265-276, vol. 49, No. 2/3.

(Continued)

*Primary Examiner*—Henry W Tsai
*Assistant Examiner*—Kris Rhu
(74) *Attorney, Agent, or Firm*—Scully, Scott, Murphy & Presser, P.C.; Daniel P. Morris, Esq.

(57) ABSTRACT

Optimizing collective operations using direct memory access controller on a parallel computer, in one aspect, may comprise establishing a byte counter associated with a direct memory access controller for each submessage in a message. The byte counter includes at least a base address of memory and a byte count associated with a submessage. A byte counter associated with a submessage is monitored to determine whether at least a block of data of the submessage has been received. The block of data has a predetermined size, for example, a number of bytes. The block is processed when the block has been fully received, for example, when the byte count indicates all bytes of the block have been received. The monitoring and processing may continue for all blocks in all submessages in the message.

20 Claims, 5 Drawing Sheets

U.S. PATENT DOCUMENTS

| | | | |
|---|---|---|---|
| 5,809,278 | A | 9/1998 | Watanabe et al. |
| 5,825,748 | A | 10/1998 | Barleu et al. |
| 5,890,211 | A | 3/1999 | Sokolov et al. |
| 5,917,828 | A | 6/1999 | Thompson |
| 6,023,732 | A | 2/2000 | Moh et al. |
| 6,061,511 | A | 5/2000 | Marantz et al. |
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,874,054 | B2 | 3/2005 | Clayton et al. |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,502,474 | B2 | 3/2009 | Kaniz et al. |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna-Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0188053 | A1* | 10/2003 | Tsai ............................ 710/22 |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1* | 9/2005 | Ganapathy et al. ............ 710/22 |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1* | 6/2007 | Kim et al. .................. 370/392 |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atElGc-11603&hilite+00304337.

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

\* cited by examiner

OPTIMIZED COLLECTIVES USING A DMA ON A PARALLEL COMPUTER

STATEMENT REGARDING FEDERALLY SPONSORED RESEARCH OR DEVELOPMENT

This invention was made with Government support under Contract. No. B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION": U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

FIELD OF THE INVENTION

The present disclosure generally relates to supercomputer systems and architectures and particularly, to optimizing the performance of collective communication operations using a DMA on a parallel computer.

BACKGROUND OF THE INVENTION

Collective communication operations involve several processes at a time if not all. Collective communication operations such as MPI (Message Passing Interface) broadcast, which broadcasts data to all the processes in the communicator, and MPI allreduce, which performs reduction operations, are important communication patterns that can often limit the performance and scalability of applications. Thus it is desirable to get the best possible performance from such operations.

BlueGene/L systems, massively parallel computers, break up a long broadcast into several shorter broadcasts. The message is broken up into disjoint submessages, called colors, and the submessages are sent in such a way that different colors use different link on the 3D (dimension) torus. In this way, a single broadcast in 1 dimension of a torus could theoretically achieve 2 links worth of bandwidth (with 2 colors), a 2 dimensional broadcast could achieve 4 links worth of bandwidth, and a 3 dimensional broadcast could achieve 6 links worth of bandwidth. On those systems, however, there is no DMA engine and instead, processors are responsible for injecting and receiving each packet. Accordingly, what is desirable is a method and system that can utilize features of a DMA engine and network so as to achieve high throughput large message collectives. It is also desirable to have a method and system that utilizes those features to realize low latency small message collectives.

BRIEF SUMMARY OF THE INVENTION

Method and system for optimizing collective operations using direct memory access controller on a parallel computer are provide. A method for optimizing collective operations using direct memory access controller on a parallel computer, in one aspect, may comprise establishing a byte counter associated with direct memory access controller for each submessage in a message. A byte counter includes at least a base address of memory and a byte count associated with a submessage. The method may also comprise monitoring the byte counter associated with a submessage to determine whether at least a block of data of the submessage has been received.

The block of data has a predetermined size. The method may further include processing the block when said block has been fully received and continuing the monitoring and processing step until all blocks in all submessages in the message have been processed.

A system for optimizing collective operations using direct memory access controller on a parallel computer, in one aspect, may comprise one or more processors in a node and memory in the node. The memory includes at least an injection fifo and a receive buffer. A direct memory access controller in the node includes at least a byte counter for each submessage of a message. A byte counter includes at least a base address in memory for storing associated submessage and a counter value. The direct memory access controller is operable to update the counter value as a result of receiving one or more bytes of the associated submessage into the node. One or more processors are operable to monitor the counter value and when a predetermined number of bytes of the submessage is received, the one or more processors are further operable to process a block of data comprising the received predetermined number of bytes of the submessage.

Further features as well as the structure and operation of various embodiments are described in detail below with reference to the accompanying drawings. In the drawings, like reference numbers indicate identical or functionally similar elements

DETAILED DESCRIPTION

Figure 1:
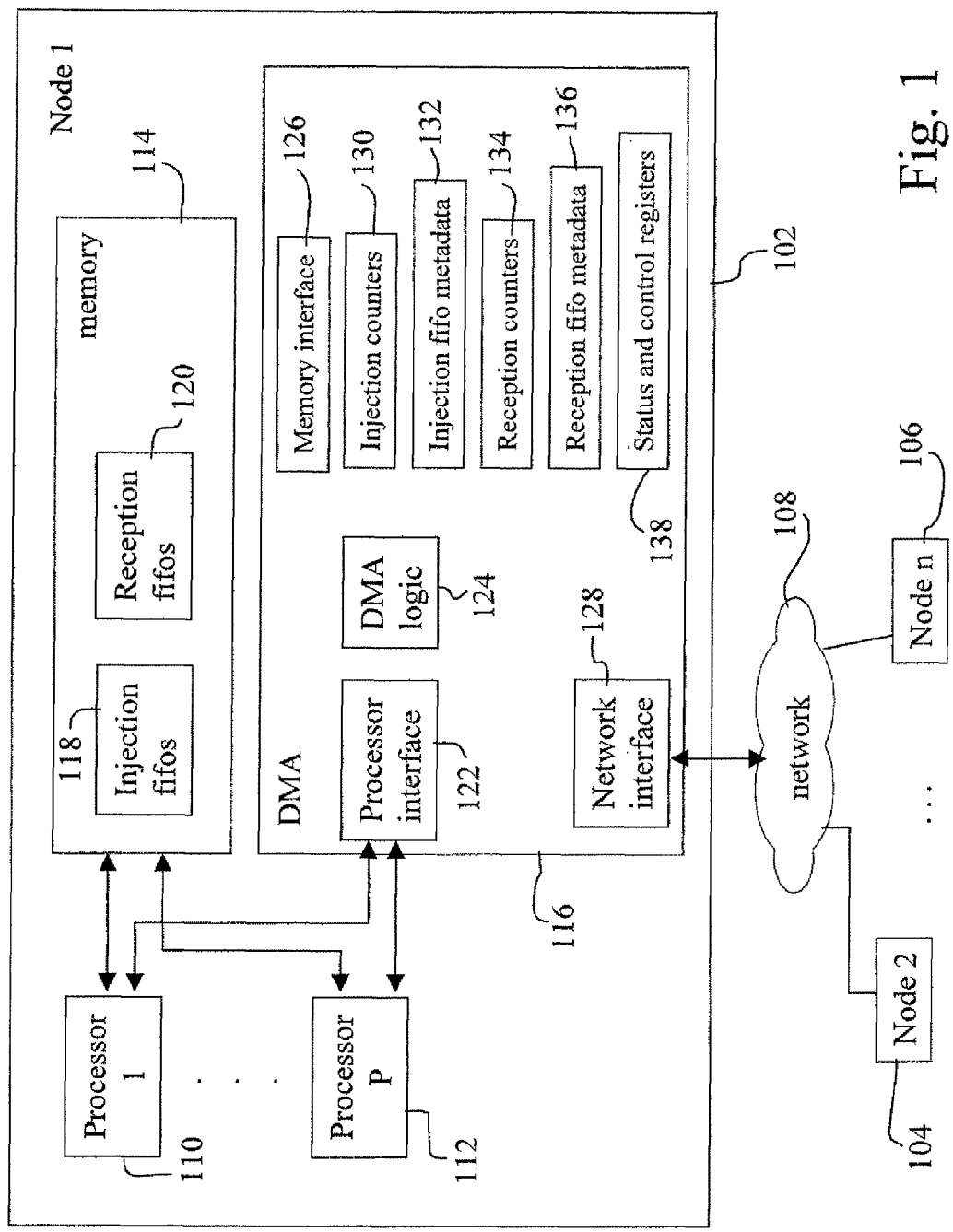
FIG. 1 illustrates a parallel computer with multiple nodes, a DMA on each node, and an interconnection network.

A method and system are disclosed that provide high throughput large message and low latency small message collective operations on a parallel machine with a DMA (Direct Memory Access) engine. In computer architecture designs of massively parallel computers or supercomputers such as BlueGene/P jointly developed by International Business Machines Corporation and other institutions, there is a DMA engine that is integrated onto the same chip as the processors, cache memory, memory controller and network logic. Briefly, DMA engine allows accesses to system memory independently of a central processing unit.

DMA in one embodiment has multiple byte counters that count the number of bytes injected into the network and received from the network. Each counter includes a base address addressing a location in memory. Each counter also includes a byte count of a packet or message injected or received. A packet contains a destination, a counter identifier (id) and an offset. The offset in packet specifies the memory position relative to the base address contained in the counter identified by the counter id, where the data of the packet is stored. A DMA unit may have, for example, 256 reception and 256 injection counters. This number may vary and depend on a design choice, thus a DMA unit may have any number of counters. A message descriptor is placed into an injection fifo (first-in-first-out). A processor in a node creates message descriptors, for example, based on the parameters or attributes of an application call such as an MPI call. This message descriptor specifies or contains information associated with the injection counter id, the number of bytes, the offset of the send buffer from the injection counter base address, a destination, a reception counter id, and an offset of the receive buffer from the reception counter base address. The destination specification or attribute may include a broadcast bit. In BlueGene/L and P systems, packets can be broadcast down a single dimension of a three dimensional torus. Several one-dimensional broadcasts may be performed to broadcast in multiple dimensions.

The present disclosure describes a method and system in one embodiment in shared memory mode, in which the processors on the same node comprise one or more threads in the same application process and have a common memory address space. Thus each processor can access all of the memory in this common address space. One of the processors is assigned to each color in an arbitrary manner. Thus a single processor could handle all colors, or different processors, each could handle a different color. For simplicity of explanation, the description herein assumes that a single processor is handling all colors, but one skilled in the art will appreciate variations in which different processors handle different colors. Thus, the method and system of the present disclosure is not limited to a single processor handling all colors.

In one embodiment of the present disclosure, a DMA engine and a plurality of counters, for instance, one reception counter per color and injection counter per color, may achieve theoretical peaks. In the method and system of the present disclosure in one embodiment, a core or a processor monitors the byte counters that track the number of received bytes. If a node is required to send the data corresponding to a particular color to another node or set of nodes, when a sufficient number of bytes is received for that color, a processor on the node injects a message descriptor into a DMA injection fifo thereby initiating transfer of the bytes out of that node. The message descriptor in one embodiment includes the injection counter identifier (id) that identifies the counter having the base address of a memory location, the offset from that base address where the data to send is stored, and the size of the sending data. Messages in different injection fifos can result in data flowing out of different links from the node. In this way, all colors can be both received and sent at the same time at every node in the network. For example, a node may receive and send on links at the same time.

Broadcast messages may be classified as long or short, for example, based on performance measurements associated with communicating those messages. For a long broadcast, software pre-arranges injection and reception counter ids for each color, and an offset from the reception counters. In one embodiment, counter ids and offsets for each color are common among the node, although they do not need to be in all cases. For instance, if there is no hardware broadcast, they need not be common. Counter ids are put into the packets as part of data that describes those packets, for instance, in a header or other portion of the packet. Assuming the byte counters decrement upon reception, all nodes program the byte counters to a suitably large number, for instance, one that is at least bigger than the message length. The source of the broadcast injects a message descriptor into an injection fifo. The DMA engine takes that descriptor, for example, from the injection fifo, puts the information from the descriptor into each packet and injects individual packets of the message into the network.

In one embodiment, it is assumed that these packets use non-overtaking deterministic routing and are always injected into the same fifos in the nodes in the network. Thus, packets arrive in the same order in which they are sent. A packet contains a reception counter id and an offset from the base reception address. In a 2D or 3D broadcast, some or all nodes along the line of the broadcast re-send the message to other nodes along a line in a different dimension of the torus. If these nodes wait until the entire message is received, suboptimal performance is achieved; for example, in a 2D broadcast, it takes twice as long as the optimized pipelined method of the present disclosure in one embodiment. Rather, there is a message length of M bytes, which is broken up into sub-messages (colors) of length M(i) bytes where M=M(1)+ ... M(C) where C is the number of colors. Color i has a block size of B(i) bytes. The re-sending nodes poll the respective reception counter until at least B(i) bytes have been received. Suppose the actual number of bytes received is U(i)>=B(i). Because of in-order delivery, the first U(i) bytes have been received. Then, the re-sending node injects a descriptor into a fifo used by that color specifying that U(i) bytes be sent down the next dimension. In one embodiment, the re-sending node uses the same reception counter ids and specifies the initial offset. The re-sending node then waits until the next B(i) bytes have been received, injects the next descriptor with an updated offset of U(i) and so on until all the bytes have been received and re-injected. In this way, if M(i) is the same for all colors and B(i) is the same for all colors, M(i)/B(i) submessages are sent, but links in all dimensions are kept busy at the same time. Thus, for long messages and B(i)/M(i) relatively small, the performance for a single color is approximately doubled compared to the non-pipelined method, and for C>1 color is approximately C times faster than an optimized single color method.

Reduction operations are used to compute a result involving data distributed over a group of processes. Examples include sum, product, minimum, maximum, and/or user defined global operations. If the operation is a reduction, then after seeing that at least B(i) bytes have been received, the nodes perform an arithmetic operation (e.g., adding integers in the incoming byte stream to a local contribution) and then resending, if necessary, the result of the operation to other nodes. Thus, when the counter indicates that the next B(i) bytes have been received, a processor performs the reduction operation on those B(i) incoming bytes with the corresponding B(i) bytes from its local contribution, storing the result in the corresponding location or slot in a receive buffer, that is, a location in memory. When the processor completes this reduction, if there is a next node in the reduction tree, the processor prepares a descriptor associated with B(i) reduced bytes and injects the descriptor into an injection fifo for sending the B(i) reduced bytes to that next node.

The broadcast is complete when each node has received all M bytes. If a node is a re-sender of color i, then the broadcast for color i is complete when the node receives and sends M(i) bytes. If a node is only a receiver of color i, then the broadcast is complete for color i when the node receives M(i) bytes. The overall broadcast for the entire message M is complete when the broadcast for all colors are complete.

If the operation is an allreduce, the operation can be pipelined as a reduction to a single node with a broadcast from that node back to the other nodes. On a 3D torus, this could be a 3 color reduce and a 3 color broadcast, that is, 3 links worth of bandwidth can be obtained.

For short reductions, latency is important. Typical MPI (message passing interface) implementations send point-to-point messages in a tree structure to perform the reduction. Messages are usually sent into a memory fifo on receiving nodes and software is responsible for polling the fifo and handling packets. The latency for polling and packet handling can be excessive. The method and system of the present disclosure in one embodiment optimizes short reduction on a set of nodes as explained below. Every node in the reduction agrees on a counter id and reception buffer. The counter identified by the counter id includes an address of a reception buffer that is used for this short message. If there are n nodes in the line and the message length is B bytes, then node number m sends its bytes to a portion of the buffer allocated for it. For example, node m sends to offset (m−1)*B from the base address stored in the counter. If the set of nodes is in a line (e.g., along a row or column of 2D network of nodes), a single descriptor broadcasting the data to every other node in the line can be used. If so, these can be arranged so that half the data flows in the positive and half flows in the negative direction. If not, n descriptors of point-to-point messages are injected. Each node receives (n−1)*B bytes (or n*B bytes if a node sends to itself). Nodes poll on the counter until all the bytes have been received at which time it performs the reduction operation on the bytes in the receive buffer. For instance, DMA logic may poll on its own reception counter until all the bytes have been received. For reductions involving larger numbers of nodes, for example on a plane, multiple steps of this procedure can be used. That is, on a plane, each node participates in a row reduction, followed by a column reduction. Measurements results using this approach show that a short reduction of a single double precision number along a row of length 8 nodes can be done in approximately one third the time it takes MPI to send and receive a single 0 byte message.

FIG. 1 shows a parallel computer with multiple nodes 102, 104, 106 connected together by a network 108. Each node may be based on the chip process that integrates all the functions of a computer into a single compute ASIC, enabling reduction of node size and power consumption. An ASIC (application-specific integrated circuit) is a microchip designed for a special application. In a supercomputer, this can be further leveraged to increase node density thereby decreasing the overall cost and increasing performance for the machine. Each node may function as both a compute node and an I/O (input/output) node in the system, and include multiple processing cores. The processor core may be a PowerPC450 embedded core available from IBM microelectronics, although future versions of this core may be used as technology improves. A node further may incorporate other functions into the ASIC. Besides the embedded processing core and floating point cores, a node may include embedded DRAM (dynamic random access memory), an integrated external DDR2 (double-data-rate two) memory controller, DMA (direct memory access), Gb, 10 Gb Ethernet functionality as well as all the network link cut-through routing buffers and routing control block that allow any two nodes to communicate with low latency. Each core or processor (for example, 110, 112, etc.) is capable of being utilized for message handling and computation operations.

A node 102 shown in FIG. 1 includes multiple processors or cores 110 . . . 112, a memory 114 and a DMA 116. The memory 114 may be DRAM, SDRAM or any other memory. The DMA 116 includes a processor interface 122, DMA logic 124, a memory interface 126, and a network interface 128, Injection Counters 130, Injection Fifo metadata 132, Reception Counters 134, Reception Fifo metadata 136 and status and control registers 138. The Injection Fifo metadata 132 describes where in memory 114 the Injection Fifos 118 are located and the current head and tail of the Fifos 118. The Reception Fifo metadata 136 describes where in memory 114 the Reception Fifos 120 are located and the current head and tail of the Fifos 120. Thus, DMA has pointers to the fifos in memory 114, for example, by means. of a reception fifo metadata 136 and injection fifo metadata 132. Injection fifos 118 in memory store descriptor data associated with message packets for injection to the network, and reception fifos 120 in memory store packets of received data from the network. Memory interface 126 is used to read and write data to the memory 114 from the DMA 116. For example, DMA logic 124 may update injection fifos 118 and reception fifos 120 via the memory interface 126. One or more processors 110, 112 on the node 102 communicate with DMA 116 via a processor interface 122. The control registers 138 are used to properly configure the DMA 116. The status registers 138 reflect the current status, such as error on hit condition of the DMA 116.

In one embodiment, message passing on the collective network comprising a plurality of nodes (for example, 102, 104, 106) may be performed through the use of a packet structure similar to that of the torus network. There may be additional support for a small number of class broadcast operations on the collective network. In one embodiment, the collective network is a token-based network, which may be utilized also for system interrupts. Messages may be non-blocking across VCs (virtual channels). Interrupts may be carried in the same data stream and may be interleaved into the data at any time, including during a packet transmission, through the use of an "interrupt" out-of-band bit. When configured as a virtual tree, messages may be injected into the collective network at any node in the system and they climb up the tree until arriving at either the tree vertex or, at a final destination depending on the type of transfer.

Figure 2:
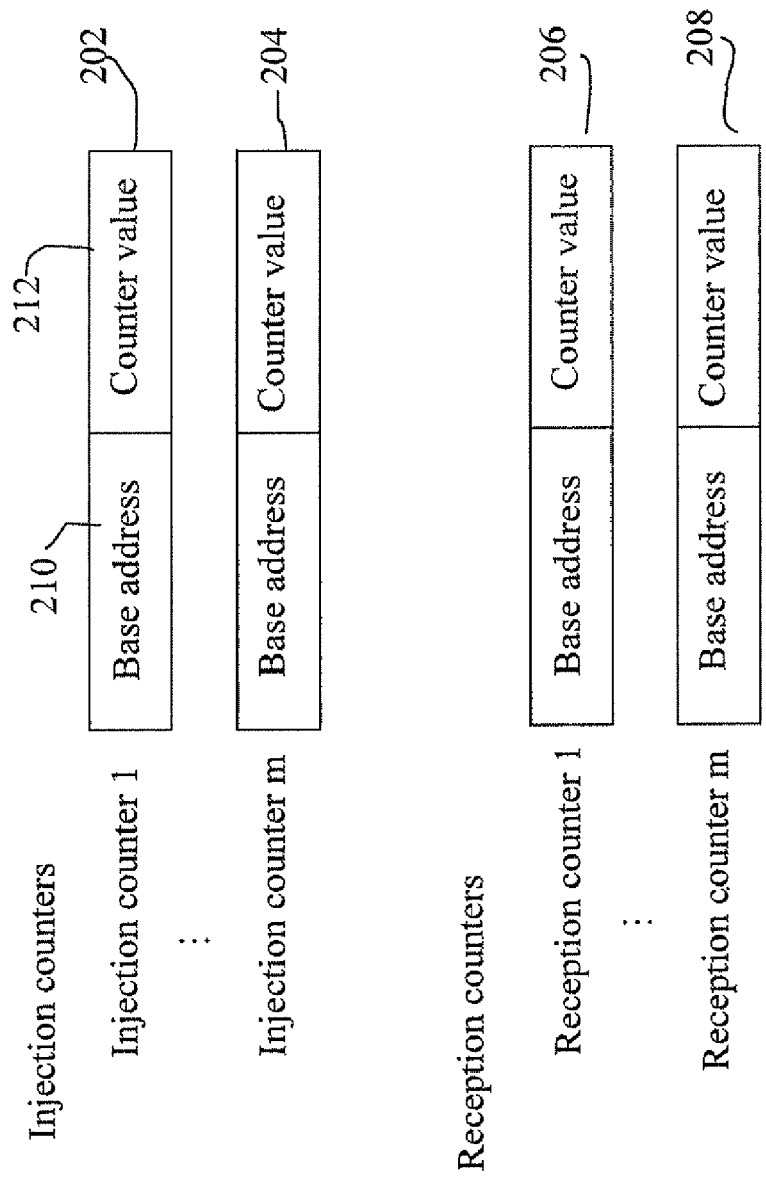
FIG. 2 illustrates a general structure of DMA byte counters in one embodiment of the present disclosure.

FIG. 2 shows detailed structure for injection counters (FIG. 1130) and reception counters (FIG. 134). Each node (FIG. 1, 102, 104, 106) may include multiple injection counters 202, 204 and multiple reception counters 206, 208. The counters may be implemented as register arrays, SRAM, or by any other mechanism. Each counter has a base address 210 that points to a location in memory and a byte counter value 212. When a DMA puts packets into the network, the packets carry a reception counter id, a byte length and an offset. When the packet is received, the bytes in the packet are written to memory location pointed to by the base address of the counter identified by the counter id, plus the offset, and the byte count value stored in the counter identified by the counter id is, for example, decremented by the number of bytes received. In one embodiment of the method and system of present disclosure, an interrupt occurs when the byte count value reaches zero, signaling that all bytes of the packet have been received.

Figure 3:
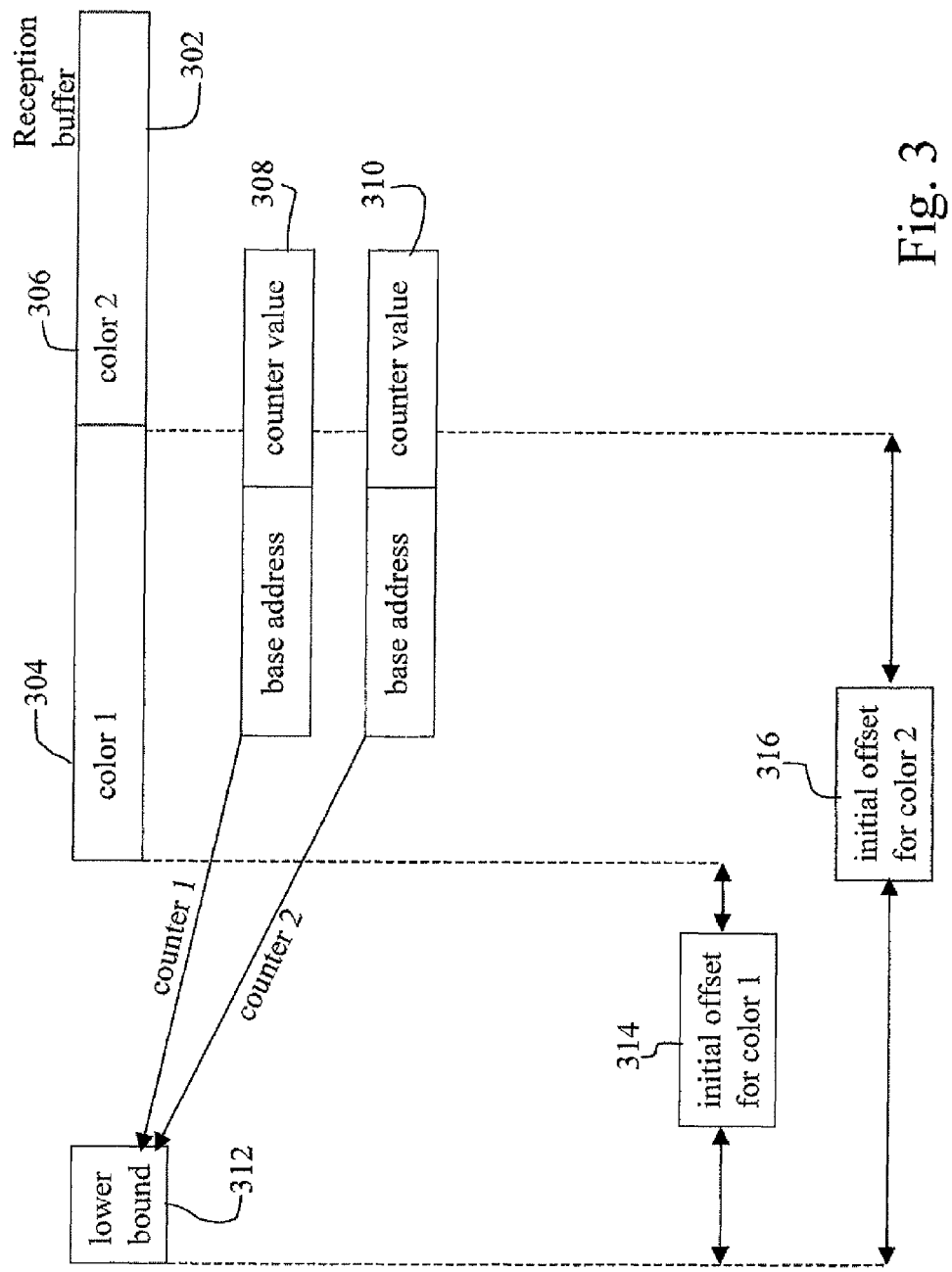
FIG. 3 illustrates a reception buffer for a broadcast split into multiple colors in one embodiment of the present disclosure.

FIG. 3 shows a single reception buffer 302. The reception buffer 302 is located in memory (for example, FIG. 1, 114) of a node. The result of a broadcast or reduction is put in this buffer. The buffer 302 is split into multiple colors, for example, color 1 304 and color 2 306, in the example shown in FIG. 3. Each color has a counter 308, 310 associated with it. In this example, the base address for each counter is the same 312, although in general each counter could have its own base address. The initial offsets for each color are shown at 314 and 316. The offsets are programmed in the corresponding descriptors. A message may include multiple colors or submessages. Each color or submessage may further be divided into a number of blocks.

Figure 4:
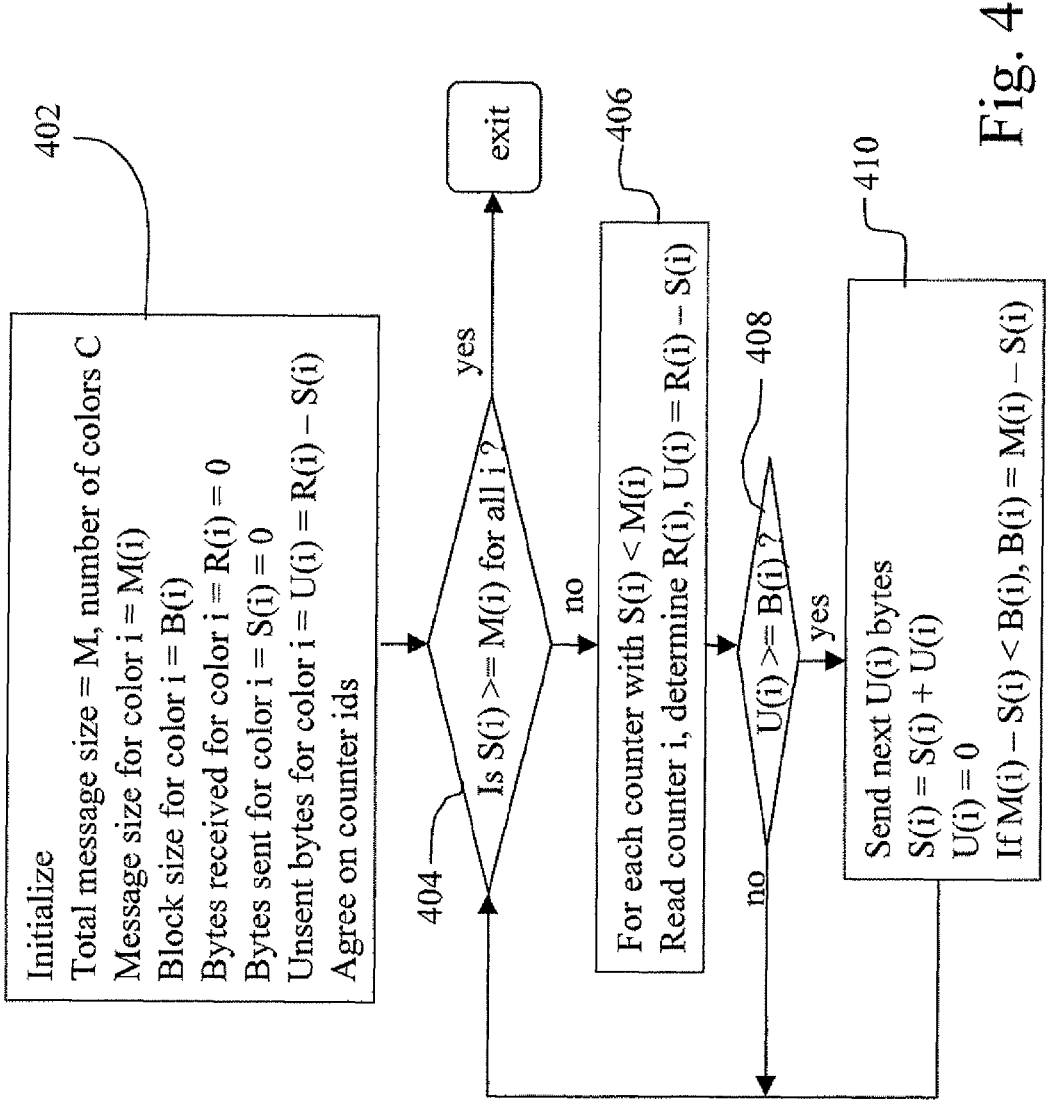
FIG. 4 is a flow diagram illustrating a method for a long broadcast in one embodiment of the present disclosure.

FIG. 4 is a flow diagram illustrating steps taken in an intermediate node in a long broadcast. A processor in the node may perform the steps. Each receiving node sets up multiple byte counters, for example, reception counters, one for each color. Each node implements the same counter id and offset for a color as other nodes in one embodiment. Counter ids for a color may be different on different nodes if a sending node can specify the correct counter id and offset to the receiving node. Thus, each node could agree on a different counter id and offset. If the hardware supports a broadcast, then the counter ids and offsets are the same on all nodes for that color.

For simplicity, FIG. 4 assumes that the intermediate node re-broadcasts all colors. More generally, a node may only need to re-broadcast some colors. Each node knows which colors to re-broadcast and to what destinations, for example, from having agreed previously by some convention or and an application programming interface telling the node, etc. For colors that the node does not re-broadcast, the node monitors the byte counters for those colors until all bytes have been received.

Step 402 illustrates an initialization step. Nodes agree on the message size M, counter ids, the number of colors C, the message size for each color M(i), the block size B(i), the number of bytes received R(i)=0, the number of bytes sent S(i)=0, and the number of unsent bytes U(i)=R(i)−S(i). The root node in the network sends out multiple color messages to certain nodes in the broadcast. These destination nodes may be different for each color. On the re-broadcasting nodes, at step 404, a node determines whether it has sent all the bytes for all its colors, if so, the node is done with processing this operation. At step 406, for colors still in progress, the node polls one or more counters identified by the counter ids agreed on during the initialization process, and determines the number of bytes received R(i) and the number of unsent bytes U(i). For instance, the number of bytes received may be determined from reading a reception counter associated with the color being processed, and the number of bytes sent may be determined from reading an injection counter associated with the color being processed. A processor in a node, for example, reads the one or more counters that the DMA engine updates when the DMA engine actually receives and/or sends the bytes.

At step 408, if U(i)<B(i), the block size, then not enough data has been received for color i and step 404 is reentered. Otherwise, a processor on the node re-sends or routes B(i) bytes to its destinations at step 410. Resending B(i) involves preparing a DMA descriptor with correct send and receive offsets for the message. A DMA descriptor includes information about the message block B(i), for example, the counter ids, the number of bytes in the message block and offsets from the base address allocated for this message block B(i). A processor, for example, creates the descriptor and injects the descriptor in the injection fifo associated with this message block B(i). This descriptor tells which injection counter to use for determining the memory address where the data to send is located. The DMA logic 124 updates the injection counter's counter value with the count of the bytes sent. Since each block of a message may have a different offset, a resending DMA in one embodiment creates offsets on a packet by packet basis so that the data is placed in and sent from the correct part of the receive buffer based on the offset that a processor specifies in the descriptor. At this point S(i) bytes have already been sent so the offsets are the initial send and receive offsets plus S(i) and the message length is U(i), if U(i) was sent. The node then updates S(i)=S(i)+U(i), sets the unsent byte count U(i)=0. The block size may need to be updated, for instance, in case the number of remaining bytes to be received and resent is less than the block size B(i). This may happen, for example, if the block is the tail of the message whose size is not an exact multiple of the block size B(i).

If the collective is a reduction, the reduction operation is performed at step 410 prior to sending the next U(i) bytes.

Sending the next U(i) bytes involves performing the reduction operation on the newly received data in the receive buffer. In one embodiment, the result of this reduction is stored in the location or slot of the receive buffer corresponding to the newly received data.

Figure 5:
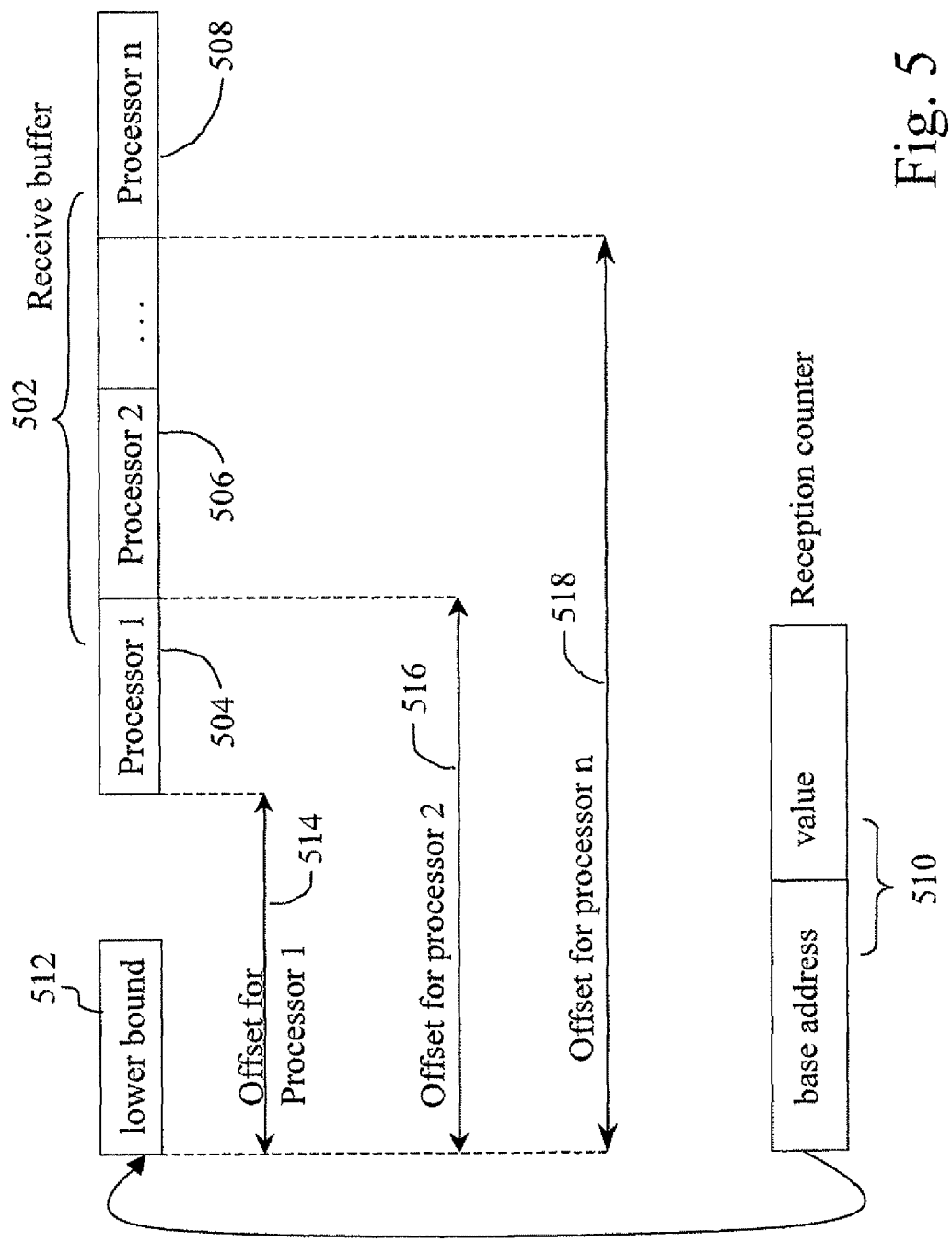
FIG. 5 shows a receive buffer for a short reduction with slots allocated for each processor in one embodiment of the present disclosure.

FIG. 5 shows a receive buffer 502 for a short reduction with slots allocated. A receive buffer 502 may be allocated in the memory of a node and is used to store data that is received into the node. Each processor is assigned its own portion of that buffer 504, 506, 508. All nodes in the reduction agree on reception counter ids. If there is a broadcast capability, the reception counter id is the same on all nodes; if there is not a broadcast capability, the reception counter id may be different on each node. On each node in one embodiment, there is a single reception counter 510 that contains a base address 514. The base address 514 points to the lower bound 512 of the memory location (e.g., receive buffer 502) where the message block is placed. The reception counter 510 also stores byte count of the message block. The offsets for each processor are shown in 514, 516 and 518. Offsets are determined from the descriptor in the packet of the message block. The offsets may range from 0 to the size of the receive buffer.

For a reduction, a processor sends a message to each node taking part in the reduction operation. This message may be a single message if there is a broadcast capability. A descriptor of the message specifies the counter id, the number of bytes and the offset corresponding to its slot in the buffer. Sending of a message is initiated, for example, by a processor that injects a descriptor into an injection fifo. A processor also places its own data, for instance, intermediate data or local contribution used in computations, in its own slot in the receive buffer 502. After sending the message, the processor polls its reception byte counter for this reduction until the expected number of bytes in the reduction have been received. The expected number of bytes is known from the semantics of the reduction software call. After receiving all bytes, each processor performs the reduction, for example, a sum, minimum, maximum, etc. Each node obtains or computes the same result for the reduction because the contents of receive buffer is identical on all nodes. Using standard software techniques, if there are many nodes in the reduction, multiple phases of the above can be used to obtain the result of the overall reduction. For example, to perform a reduction in a 2-D (dimension) plane, each node can set up buffers and counters for two reductions, a row and a column reduction. Nodes first participate in a reduction along its first dimension (row) and then feed the result of that reduction into a reduction along the second dimension (column).

In another embodiment the method and system may operate in "Virtual Node Mode", in which the memory is partitioned so that each processor can read and write only a portion of memory. If a processor can read, but not write, the memory of the other processors, the processor handling a color sets a memory address to point to the start of its receive buffer and another address for the number of bytes received for that color. These addresses are known to all processors on the node, for example, via appropriate software calls.

For a broadcast, as bytes are received, the processor handling the color updates its bytes received memory location as blocks are processed. The other nodes can read this location and copy bytes from the handler's receive buffer to its own receive buffer as blocks are received.

For a reduction, the processor handling the color performs the reduction operation on the received data by combining data received from the network and the local contributions of all the processors. When this is complete for each block, the other processors can copy the result of the reduction for that block into its own memory.

If a processor cannot normally read the memory of the other processor, a system call can be made that gives other processors read access to a limited portion of the memory. This system call can be made prior to the broadcast or reduction to cover the relevant areas of memory, then the above-described technique with respect to a broadcast can be used.

The embodiments described above are illustrative examples and it should not be construed that the present invention is limited to these particular embodiments. For example, while some of the memory structure were shown and described in terms of fifo, any other queuing or structuring mechanism may be used. Thus, various changes and modifications may be effected by one skilled in the art without departing from the spirit or scope of the invention as defined in the appended claims.

We claim:

1. A method for optimizing collective operations using direct memory access controller on a parallel computer, comprising:

establishing a byte counter associated with direct memory access controller for each submessage in a message, the byte counter storing at least a base address of memory and a byte count associated with a submessage, the byte counter including at least a reception counter and an injection counter;

monitoring the byte counter associated with a submessage to determine whether at least a block of data of the submessage has been received, the block of data having a predetermined size;

processing the block when said block has been fully received; and continuing the monitoring and processing step until all blocks in all submessages in the message have been processed.

2. The method of claim 1, wherein the step of processing includes:

sending the block when said block has been fully received.

3. The method of claim 1, wherein the step of processing includes:

performing a reduction operation on the block.

4. The method of claim 3, wherein the step of processing further includes:

sending result of the reduction operation to a next node on a parallel computer.

5. The method of claim 1, wherein the step of monitoring includes:

reading a byte counter value stored in the byte counter and updated by a direct memory access controller to determine whether the block of data of the submessage has been received.

6. The method of claim 1, wherein the step of processing includes:

generating a message descriptor describing at least a counter identifier and offset in memory associated with the block of data; and resending the block of data to a next node in a parallel computer.

7. The method of claim 6, wherein the step of processing further includes:

injecting the message descriptor into a fifo in memory associated with the block of data.

8. The method of claim 7, wherein the step of processing further includes:

modifying fifo metadata associated with the block in a direct memory access controller, wherein the direct memory access controller reads the fifo metadata and corresponding message descriptor in the fifo in memory to trigger resending of the data block described by the message descriptor.

9. The method of claim 1, wherein all nodes in the parallel computer agree on counter identifiers used for said each submessage in the message.

10. The method of claim 1, wherein the message is a broadcast message.

11. The method of claim 1, wherein the message is a reduction operation message.

12. A system for optimizing collective operations using direct memory access controller on a parallel computer, comprising:

one or more processors in a node;

memory in the node, the memory including at least an injection fifo and a receive buffer;

direct memory access controller in the node, the direct memory access controller including at least a byte counter for each submessage of a message, the byte counter including at least a base address in memory for storing associated submessage and a counter value, the byte counter including at least a reception counter and an injection counter, the direct memory access controller operable to update the counter value as a result of receiving one or more bytes of the associated submessage into the node;

said one or more processors operable to monitor the counter value and when a predetermined number of bytes of the submessage is received, the one or more processors further operable to process a block of data comprising the received predetermined number of bytes of the submessage.

13. The system of claim 12, wherein said one or more processors are operable to resend the block of data by updating a message descriptor in the injection fifo with information about the block of data.

14. The system of claim 13, wherein the information about the block of data includes at least a counter identifier associated with the submessage, the counter identifier including at least a base address in memory, and an offset from the base address in memory where the block of data is stored.

15. The system of claim 12, wherein the block of data is stored in the receive buffer.

16. The system of claim 12, wherein said one or more processors are operable to read the byte counter to determine a number of bytes received for the submessage.

17. The system of claim 12, wherein the message is a collective operation message in a parallel computer.

18. The system of claim 12, wherein said one or more processors are operable to perform a reduction operation on the block of data.

19. The system of claim 18, wherein said one or more processors are operable to send a result of the reduction operation on the block of data.

20. A method for optimizing collective operations using direct memory access controller on a parallel computer, comprising:

allocating a reception buffer on a node for receiving a message, the reception buffer having different slots for storing data received from different nodes on a parallel computer;

defining a counter identifier associated with a counter on the node, the counter identifier being common among all nodes on the parallel computer and the counter comprising at least a base address of the reception buffer for placing a message and a counter value indicating a count of received data;

receiving at a node a message from all the nodes;

polling the counter value until the count of received data equals a predetermined size of data that is expected to be received; and performing a short reduction on the received message.

* * * * *